Dec. 30, 1941.　　　J. P. LAWLOR　　　2,268,076
WATER PURIFYING APPARATUS
Filed Jan. 24, 1941
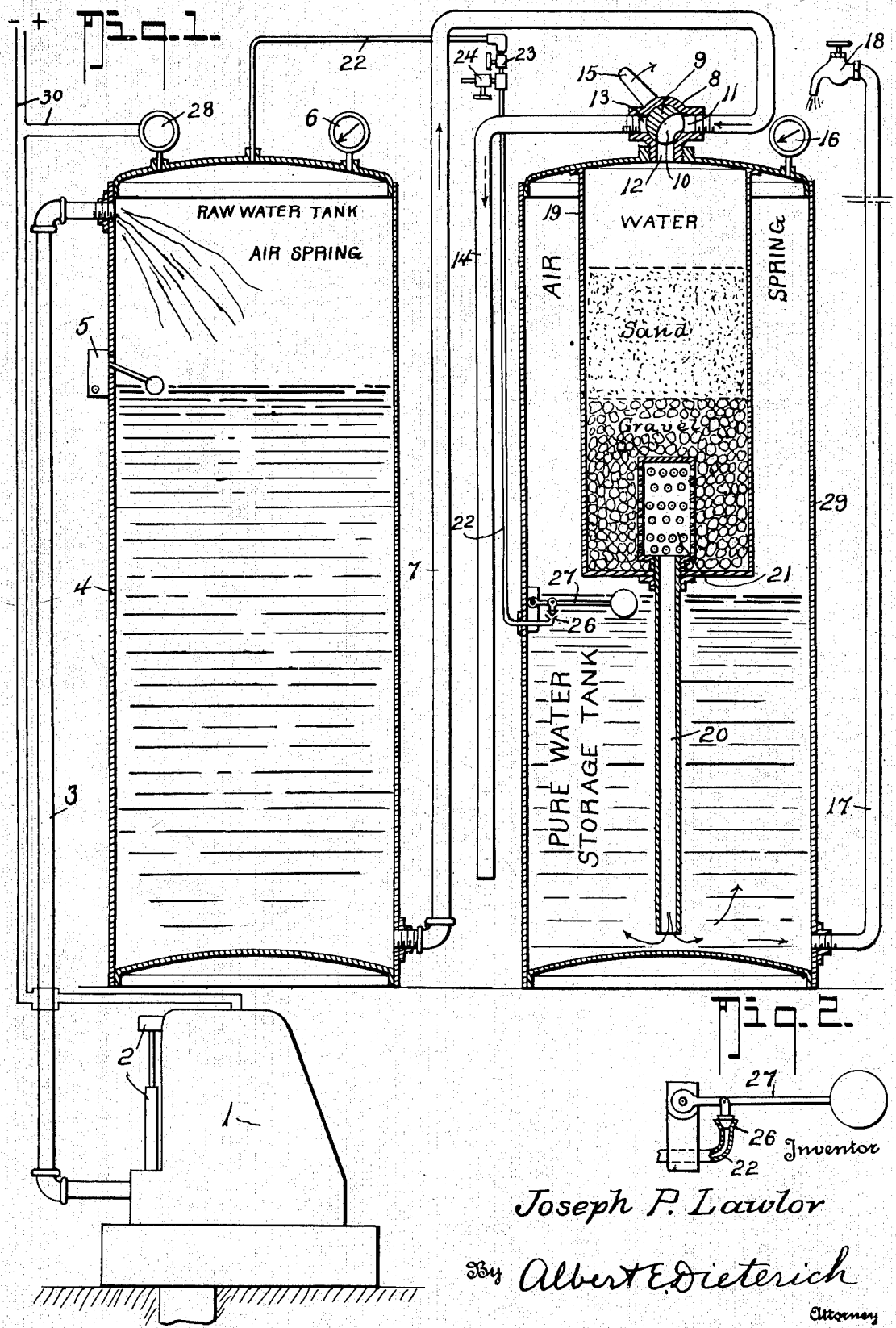
Joseph P. Lawlor
By Albert E. Dieterich
Attorney Patented Dec. 30, 1941

2,268,076

UNITED STATES PATENT OFFICE 2,268,076

WATER PURIFYING APPARATUS

Joseph P. Lawlor, Ames, Iowa

Application January 24, 1941, Serial No. 375,843

3 Claims. (Cl. 210—26)

My invention relates to apparatus for purifying water and it especially relates to means used primarily for the removal of iron from well water supplies.

More specifically, the present invention relates to the kind of apparatus disclosed in my application for patent filed June 13, 1940, Ser. No. 340,383, and it particularly has for its object to provide an embodiment of the generic invention present in that application, which embodiment provides certain economies in manufacture, cost of installation, etc., over the embodiment of the invention disclosed specifically in my aforesaid application.

Again, it is an object to provide a more compact apparatus, and one with fewer parts to set up and connect together during the process of installation than is the case with the apparatus disclosed specifically in my aforesaid application.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a diagrammatic view of the installation embodying my present invention.

Fig. 2 is an enlarged detail of the float-controlled air valve.

In the drawing, in which like numbers of reference indicate like parts in all the figures, 1 indicates a conventional well pump and 2 a conventional air pump by which water and air are delivered through a pipe 3 into the top part of a raw water storage tank 4. This tank, at a suitable level, is provided with a float-controlled air-release valve 5.

A pressure gauge 6 on the tank 4 serves to indicate the pressures within the tank and a pressure controlled switch 28 controls the stopping and starting of the pump motor (not shown) via the circuit wires 30. When the water level in tank 4 falls below a predetermined place, and the air pressure drops accordingly, the switch 28 closes the circuit and the pump operates until the tank 4 has again been filled to the desired level and the pressure has attained the predetermined degree to open switch 28. The air in tank 4, when the tank is full, serves as an air spring.

In my present apparatus the filter and the repression tank, as well as the three shut-off valves of the apparatus of my application aforesaid are combined into a single unit, the parts of which are assembled at the factory and shipped and installed as a unit. This unit comprises the repression of pure water storage tank 29, the built-in filter 19, the main valve 8, 9 and its connections to the filter 19, and the pipe 20 which operatively connects the filter and tank 29.

The filter end of the pipe 20 carries a strainer 21 within the filter 19.

Within the tank 29 is mounted a float-controlled air valve device comprising a float lever 27, an air inlet duct 22 having a suitable valve seat 26. The duct 22 connects with the air space of tank 4, and has a shut-off valve 23 and a valve 24 in a branch to atmosphere. This float-controlled air valve is for the purpose of maintaining a fairly constant quantity of air above the water in repression tank 29.

In setting up the apparatus the tank 4 is connected to the pumps 1 and 2 by the pipe 3 and by a pipe 7 with the valve housing 8 at its water port 11. To the other water port 13 the back wash discharge pipe 14 is connected.

The valve proper 9 has a duct 10 which serves, when the lever 12 is in one position, to connect port 11 to port 12, and when the lever is moved over to its other position the duct 10 connects port 12 with port 13.

By providing the float-controlled air valve device shown in Fig. 2, when the water in tank 29 is low this valve remains closed, but if the water rises above the float the float automatically opens the air line 22 which effects communication with the air space in tank 4 and admits air therefrom into tank 29. Thus a definite volume of air is maintained above the water in repression tank 29.

I also wish to call attention to the fact that sometimes water has a pH under 7, meaning it is on the acid side. Water with a low pH is aggressive. The pH can usually be raised by mixing a little pure crushed limestone or like material with the filter sand, and I prefer to do this when treating water with a low pH.

The tank 29 may be provided with a pressure gauge 16.

The house service pipe 17 connects to the lower part of tank 29 and has the usual faucet 18.

Operation

After setting up the apparatus the pumps 1 and 2 are set into operation. Valve 8, 9 is set as shown in Fig. 1.

Water and air are pumped into tank 4 from which the water flows through pipe 7 and duct 10 of valve 8, 9 into filter 19, down through the filter and out, via pipe 20, into the bottom of tank 29. With faucet 18 closed the air in tank 29 is compressed as water enters the tank from pipe 20 to form an air spring.

As soon as tank 4 and tank 29 shall have become filled to the desired level the switch 28 will operate to open the pump motor circuit 30 and stop the pump. The system is now ready for service.

When faucet 18 is opened, water starts movement through pipe 17 from two sources, namely, tank 29 and tank 4. It is obvious that when faucet 18 is closed for a period of time the pressures in tanks 4 and 29 become balanced. Consequently when faucet 18 is opened, tanks 4 and 29 start to feed into pipe 17, repression or purewater storage tank 29 feeding direct and tank 4 feeding through the filter 19.

Assume that faucet 18 is opened so as to deliver ten gallons per minute. This will not result in a ten-gallon-per-minute rate of travel through the filter 19 because of the available storage in repression tank 29. The reduced pressure will, however, start a flow through filter 19 at the rate of a little less than half the rate at which water is drawn. In other words, the rate of flow through the filter would be reduced from ten gallons per minute down to four or five gallons per minute. After faucet 18 is closed, water from tank 4 will continue to travel into repression tank 29 via the filter 19. For example, assume that faucet 18 is opened for one minute and then closed, filter 19 would start operation as soon as faucet 18 is opened. After faucet 18 is closed, the water continues to flow from tank 4 to repression tank 29, through filter 19 for a considerable period of time, or until the pressure is again equalized in tank 4 and repression tank 29. During the above operation of opening and closing faucet 18, pump 1 may or may not be operating; that is immaterial. Owing to the fact that the filter is functioning when service valves or faucets are closed, it is obvious that filter 19 can be much smaller than would be necessary without the use of repression tank 29. The smaller the filter necessary, the less expensive the installation.

In due time a heavy iron precipitate is collected on top of filter sand and must be removed. This is done by back-washing the filter sand. By back-wash is meant the reversing of the flow of water in filter 19 so as to travel upward, lifting off the precipitated iron and carrying it to waste. The back-washing of this plant is accomplished in the following simple manner:

Valve 9 is turned 90° from the position shown in Fig. 1. This shuts off flow from pipe 7 to filter 19 and connects pipe 14 to the inlet side of the filter. Air above the water in repression tank 29 is sufficient to force water from tank 29 up through pipe 20 into and through filter 19 and out through back-wash discharge pipe 14. By the time the water in tank 29 has been exhausted the filter is sufficiently clean to put back into operation. To put the apparatus back into operation, merely return valve 9 to the position shown in Fig. 1. By the time the back-wash has been completed, pressure will have dropped in tank 4 sufficient to start pump 1. As the water and air pressure builds up in tank 4, approximately one-half of the water pumped moves slowly through filter 19 into repression tank 29. If pump 1 is delivering ten gallons per minute, filter 19 is operating at approximately five gallons per minute as half of the water pumped is being stored in tank 4 and the balance is in the repression tank 29.

From the foregoing, taken in connection with the accompanying drawing, it is thought the construction, operation and advantages of my invention will be clear to those skilled in the art.

What I claim is:

1. In a water system, two pneumatic pressure tanks each having an air space at the top, means for delivering air and water into the first of said tanks, a service pipe line for conveying water from the second of said tanks, a filter within the second of said tanks, said filter including a filtering material and a closed compartment containing the same, means for delivering filtered water from the filter into the second of said tanks, means for delivering water from the first of said tanks into said filter, and means for delivering air from the first to the second of said tanks, said air delivering means including a float-controlled air valve having means for opening the valve when the water in the second tank reaches a predetermined level and to close the valve again when the water falls below said predetermined level.

2. In a water system, two pneumatic pressure tanks each having an air space at the top, means for delivering air and water into the first of said tanks, a service pipe line for conveying water from the second of said tanks, a filter having an inlet and an outlet side and being located within the second of said tanks, said filter including a filtering material and a closed compartment containing the same, means for delivering filtered water from the outlet side of said filter into the second of said tanks, means for delivering water from the first of said tanks into said filter, means for delivering air from the first to the second of said tanks, and a valve device for controlling the water delivery to said filter from said first tank, said valve device having means for opening the inlet side of the filter to atmosphere and for cutting off the delivery of water to the filter from said first tank for back-washing purposes, said air delivering means including a float-controlled air valve positioned at the normal level of the water, in the second tank to admit air from the first tank into the second tank when the water in the second tank rises above a predetermined level.

3. In a water system, two pneumatic pressure tanks each having an air space at the top, means for delivering air and water into the first of said tanks, a service pipe line for conveying water from the second of said tanks, a filter within the second of said tanks, said filter including a filtering material and a closed compartment containing the same, means for delivering filtered water from the filter into the second of said tanks, means for delivering water from the first of said tanks into said filter, and means controlled by the water in the second tank for delivering air from the first tank into the second tank when the water reaches a predetermined level, said last named means including an air duct leading from the air space of the first tank into the second tank and a float controlled valve operable by the water in the second tank for governing the admission of air from said duct into said second tank.

JOSEPH P. LAWLOR.